United States Patent
Johnson et al.

(10) Patent No.: US 7,224,711 B2
(45) Date of Patent: May 29, 2007

(54) SYSTEM AND METHOD FOR THE MITIGATION OF SPECTRAL LINES IN AN ULTRAWIDE BANDWIDTH TRANSCEIVER

(75) Inventors: Terence L. Johnson, Fairfax, VA (US);
John W. McCorkle, Vienna, VA (US);
Phuong T. Huynh, Annandale, VA (US)

(73) Assignee: Freescale Semiconductor Inc., Austin, TX (US)

( * ) Notice: Subject to any disclaimer, the term of this patent is extended or adjusted under 35 U.S.C. 154(b) by 0 days.

(21) Appl. No.: 10/902,021

(22) Filed: Jul. 30, 2004

(65) Prior Publication Data

US 2006/0023771 A1 Feb. 2, 2006

(51) Int. Cl.
*H04B 1/69* (2006.01)
(52) U.S. Cl. ...................................... 375/130
(58) Field of Classification Search ................. 375/130, 375/131, 139, 146, 239; 370/213; 332/112
See application file for complete search history.

(56) References Cited

U.S. PATENT DOCUMENTS

| | | | |
|---|---|---|---|
| 6,603,818 B1 * | 8/2003 | Dress et al. | 375/295 |
| 6,735,238 B1 * | 5/2004 | McCorkle | 375/130 |
| 6,909,337 B2 * | 6/2005 | Kim et al. | 332/108 |
| 2003/0169828 A1 * | 9/2003 | Roberts | 375/295 |
| 2003/0199279 A1 * | 10/2003 | Roberts | 455/452.2 |

FOREIGN PATENT DOCUMENTS

WO WO 01/93441 A1 * 12/2001

OTHER PUBLICATIONS

Notification of Transmittal of International Preliminary Report on Patentability from Patent Cooperation Treaty issued on Aug. 21, 2006 for the corresponding PCT patent application No. PCT/US05/26420 (a copy thereof).
International Preliminary Report on Patentability from Patent Cooperation Treaty issued on Aug. 2, 2006 for the corresponding PCT patent application No. PCT/US05/26420 (a copy thereof).
International Search Report issued from International Searching Authority issued on Feb. 21, 2006 for the corresponding International patent application No. PCT/US05/26420 (a copy and English translation thereof).

* cited by examiner

*Primary Examiner*—Young T. Tse

(57) ABSTRACT

A method and an apparatus are provided for mitigating spectral lines in a wireless signal. First a code word is generated that is made up of a plurality of binary or ternary encoded pulses. Then a plurality of code-word-modulated wavelets are generated in response to the code word. These wavelets can be Gaussian monopulses, repeated cycles of a sine wave, or other shaped impulse signals. The plurality of code-word-modulated wavelets are then modulated with a bit of transmit data to form a plurality of data-modulated wavelets. This modulation serves to whiten the signals since the transmit data is effectively random. Finally, the plurality of data-modulated wavelets are transmitted to a remote device.

23 Claims, 9 Drawing Sheets

SYSTEM AND METHOD FOR THE MITIGATION OF SPECTRAL LINES IN AN ULTRAWIDE BANDWIDTH TRANSCEIVER

FIELD OF THE INVENTION

The present invention relates in general to wireless communication systems, such as ultrawide bandwidth (UWB) systems, including mobile transceivers, centralized transceivers, related equipment, and corresponding methods. Another aspect of the present invention relates to a wireless transceiver that can provide high speed signals, but minimize the spectral lines in the resulting signal spectrum. Another aspect of the present invention relates to a method and circuit for eliminating undesirable harmonics in a transmitted signal.

BACKGROUND OF THE INVENTION

Ultrawide bandwidth (UWB) signals allow large amounts of data to be sent very rapidly at very low power. The UWB signals have their energy spread over a large frequency band, which significantly reduces the interference on any particular lesser frequency band. Nevertheless, it is desirable to keep low both the total power spectral density of a transmitted UWB signal, as well as the highest peak of the UWB signal's power spectral density.

FIG. 1 is a block diagram of a basic ultrawide bandwidth (UWB) transmitter circuit that can be used in a UWB transceiver. As shown in FIG. 1, the transmitter circuit 100 takes a set of transmit data and provides it to a signal generator 110. The signal generator 110 generates a UWB signal that has the transmit data encoded on it and provides that encoded signal to an antenna 120 for transmission.

In the embodiment shown in FIG. 1, a UWB antenna may be used, such as the one disclosed in U.S. Pat. No. 6,590,545 to McCorkle, entitled "Electrically Small Planar UWB Antenna Apparatus and System Thereof." However, alternate embodiments can use different antenna designs.

In order for a UWB transceiver to function, it must generate signals at a very high frequency. In one proposed implementation of a UWB transceiver, signals up to nearly 10 GHz must be generated. However, many ways of generating appropriate UWB signals at such high frequencies introduce undesirable harmonics into the signals, which in turn can cause spikes (referred to as spectral lines) in the power spectral density of the transmitted signal.

One particular cause of undesirable harmonics comes from signal leakage in non-ideal circuit elements. Such leakage currents and voltages can introduce periodic interference or noise into a transmitted signal. And any periodic noise in a transmitted signal can produce undesirable spectral lines in that signal.

This can cause problems in the operation of UWB devices since under current FCC regulations the transmit power for UWB devices is limited by the power spectral density (PSD) of the transmitted signal. FIG. 2 is a graph showing the shape of power spectral density limits currently put in force by the FCC for the operation of UWB devices. They impose a maximum limit in the range of about 3-10 GHz, with increasing drops outside of this range.

The FCC will not allow any portion of the power spectral density of a UWB signal to rise above the limits it imposes. As a result, if a UWB signal includes a spike in its power spectral density, the total transmission power of the UWB signal must be reduced until that spike falls below the FCC's power limits. This can significantly reduce the total signal power of the transmitted signal. Thus, any spectral lines (i.e., spikes in the power spectral density) in a signal transmitted by a UWB device can reduce the effectiveness of that device. It is therefore very important that the power spectral density of the signal output by the signal generator 110 and transmitted by the antenna 120 be strictly controlled, and be as even as possible.

Accordingly, it would be desirable to reduce the magnitude of any spikes in the power spectral density of any UWB signal generated by a UWB transceiver.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

In order to maximize the transmit power in a UWB device, but still remain within allowable FCC limits, it is desirable to generate the signals with as few and as small spectral lines as possible.

First Exemplary Embodiment

Figure 1:
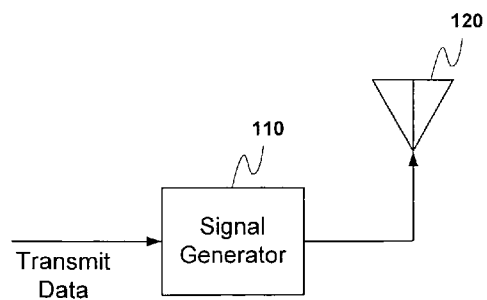
FIG. 1 is a block diagram of a basic ultrawide bandwidth transmitter circuit that can be used in a UWB transceiver.
Figure 2:
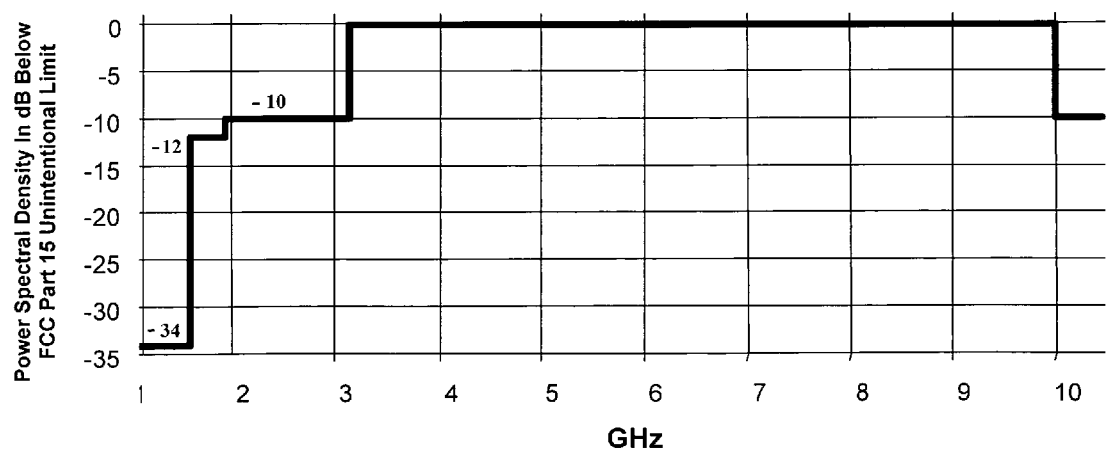
FIG. 2 is a graph showing the relative power spectral density limits currently put in force by the FCC for the operation of UWB devices.
Figure 3:
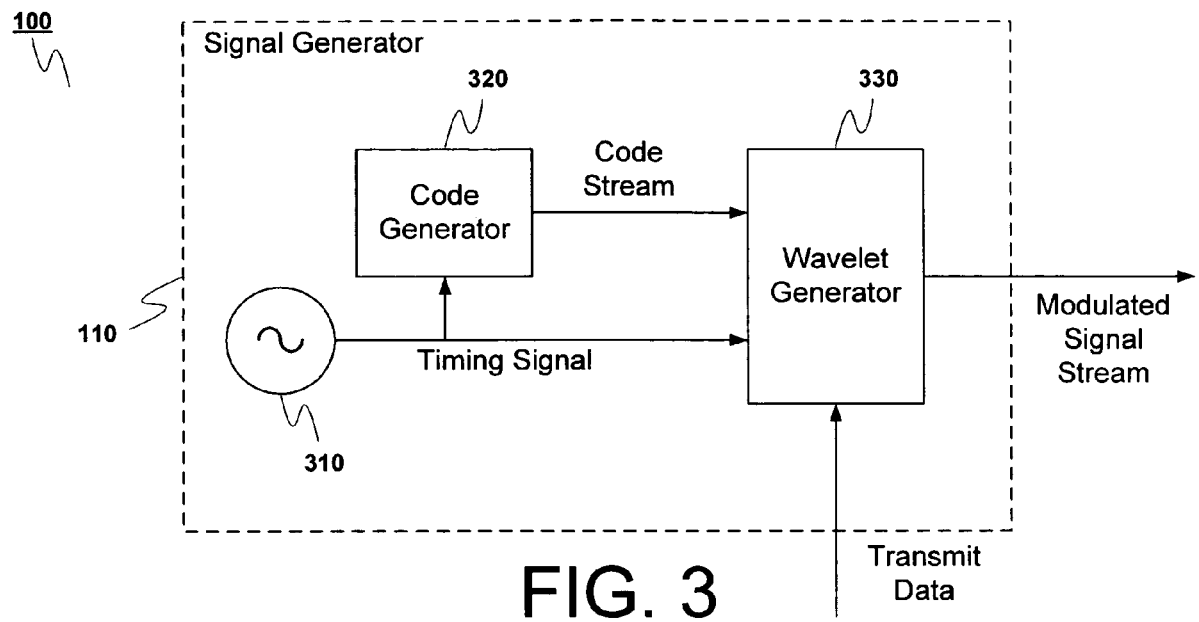
FIG. 3 is a block diagram of an exemplary embodiment of the signal generator from FIG. 1.

FIG. 3 is a block diagram of an exemplary embodiment of the signal generator from FIG. 1. Such a signal generator could be used in the UWB transceiver shown in FIG. 1. As shown in FIG. 3, the signal generator 110 includes a local oscillator 310, a code generator 320, and a wavelet generator 330.

The local oscillator 310 provides a signal with a reference frequency to the code generator 320 and the wavelet generator 330. In this embodiment the local oscillator 310 generates a clock signal at a chipping frequency (i.e., the frequency at which values in a code word are generated). Alternate embodiments could use different waveforms at different frequencies, however.

In the disclosed embodiment, the code generator 320 operates to generate a code stream that corresponds to a series of code words used for transmission of a UWB signal. Each code word comprises a series of pulses of a given code word length with each pulse having one of a particular set of values. Some exemplary code words types are binary encoded (where the pulses have values of +1 or −1) and ternary encoded (where the pulses have values of +1, 0, or −1). Some exemplary code word lengths are 6, 12, or 24.

However, alternate code word types and lengths can be used in alternate embodiments.

In the disclosed embodiments the code stream generated by the code generator 320 is a square wave having values that correspond to +1 or −1 for binary codes or +1, 0, or −1 for ternary codes. These positive and negative values correspond to +a volts and −a volts, where a is a designated code voltage. The zero value can correspond to a zero voltage.

The wavelet generator 330 receives the timing signal from the local oscillator 310, the code word pulses from the code generator 320, and a transmit data signal that includes data bits to be transmitted. It operates to generate a series of wavelets that are formed into wavelets that are modulated by both the code word and the transmit data. The orientation and placement of the wavelets corresponds to the orientation and arrangement of the pulses from the code generator 320, modulated according to the transmit data. The modulated signal stream output by the wavelet generator is then sent to the antenna 120 for transmission. The wavelets formed by the wavelet generator 330 should each be the same width as the pulses output from the code generator 320 (i.e., the wavelets should be generated at the chipping rate), and should be synchronized with the code pulses (i.e., each wavelet should be coincident with one code pulse).

In operation the code generator 320 outputs a code stream that comprises a repeated series of L pulses, where L is a code word length. The pulses are given values that correspond to a length L code word, and the code word pulses are generated in a constant code stream, one after the other. Thus when one code word ends, the code stream simply repeats another code word.

The code stream is provided to the wavelet generator 330, as is the transmit data stream. The wavelet generator 330 takes these signals and generates a modulated signal stream containing a series of wavelets modulated according to the values of the pulses in the code stream and the data in the transmit data stream.

The wavelet stream is modulated by both the code word and the current data bit. Although the actual order of modulation can vary in different embodiments, practically this operation can be considered as modulating the wavelet stream with a code word that is modulated by the current data bit. In this way, values of the pulses in a code word are multiplied by +1 if the data bit is a digital "1" and by −1 if the data bit is a digital "0."

Consider two examples. If a length 6 binary code word of −1 1 1 −1 −1 1 was used, the data-modulated code word could be −1 1 1 −1 −1 1 if the current data bit was a logical "1," and could be 1 −1 −1 1 1 −1 if the current data bit was a logical "0." Likewise, if a length 12 ternary code word of 1 −1 0 1 1 −1 −1 0 −1 1 0 1 was used, the data-modulated code word could be 1 −1 0 1 1 −1 −1 0 −1 1 0 1 if the current data bit was a logical "1," and could be −1 1 0 −1 −1 1 1 0 1 −1 0 −1 if the current data bit was a logical "0." (An inverted null wavelet remains unchanged in its inverse.) Alternate embodiments could use other code words and could reverse which orientation of the code word corresponds to a logical "1" and which orientation corresponds to a logical "0." Regardless, the data rate is $1^{th}/L$ of the chipping rate, where L is the code word length.

The code pulses generated by the code generator 320 and the wavelets generated by the wavelet generator 330 are kept in synchronization by the timing signal generated by the local oscillator 310. The code pulses and the wavelets are also synchronized with the transmit data such that each data bit overlaps one code word. This is possible since the chipping rate is L times the data rate.

In one embodiment the data rate is 114 MHz, the local oscillator operates at 1.368 GHz, and the chipping rate is 1.368 GHz. In another embodiment, the data rate is 228 MHz, the local oscillator operates at 2.736 GHz, and the chipping rate is 2.736 GHz. Alternate embodiments can use different timing signals, data rates, and chipping rates. For example, one alternate embodiment uses a 1.3 GHz timing signal and varying chipping rates of 1.313, 1.326, 1.352 GHz.

In one embodiment each wavelet is formed by a Gaussian monopulse; in another embodiment each wavelet is formed by three consecutive repetitions of a sine wave. In either case, the wavelet is formed such that it can have two different orientations, each the inverse of the other, to allow for binary or ternary modulation. Alternate embodiments can use alternate wavelet designs, however. And while certain advantage is obtained by having the bi-phase wavelet orientations that are inverses of each other, some embodiments could use bi-phase wavelet orientations that are not signal inverses.

Figure 4:
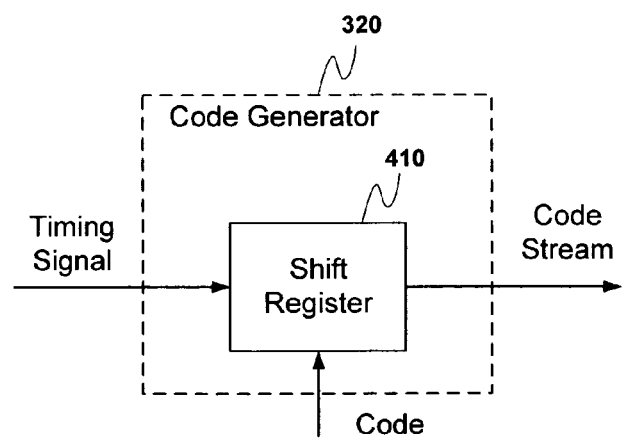
FIG. 4 is a block diagram of an exemplary embodiment of the code generator from FIG. 3.

FIG. 4 is a block diagram of an exemplary embodiment of the code generator from FIG. 3. As shown in FIG. 4, the code generator 320 includes a shift register 410.

The shift register 410 produces a series of square pulses corresponding to a selected code word. These pulses are synchronized in time by a timing signal (such as the timing signal generated by the local oscillator 310) and set according to a code signal. This code signal may indicate both a code length and the values for that code word. After it finishes producing one code word, the shift register 410 cycles back and begins sending the same code word once again, repeating this process as many times as is necessary.

In some embodiments the shift register 410 will have a single code word that is always used. In this case, the code signal input is not needed. In other embodiments the shift register 410 can generate a variety of code words of the same or different lengths in response to the code signal. If the code word length never changes, then the code signal need not contain information regarding code word length.

Figure 5:
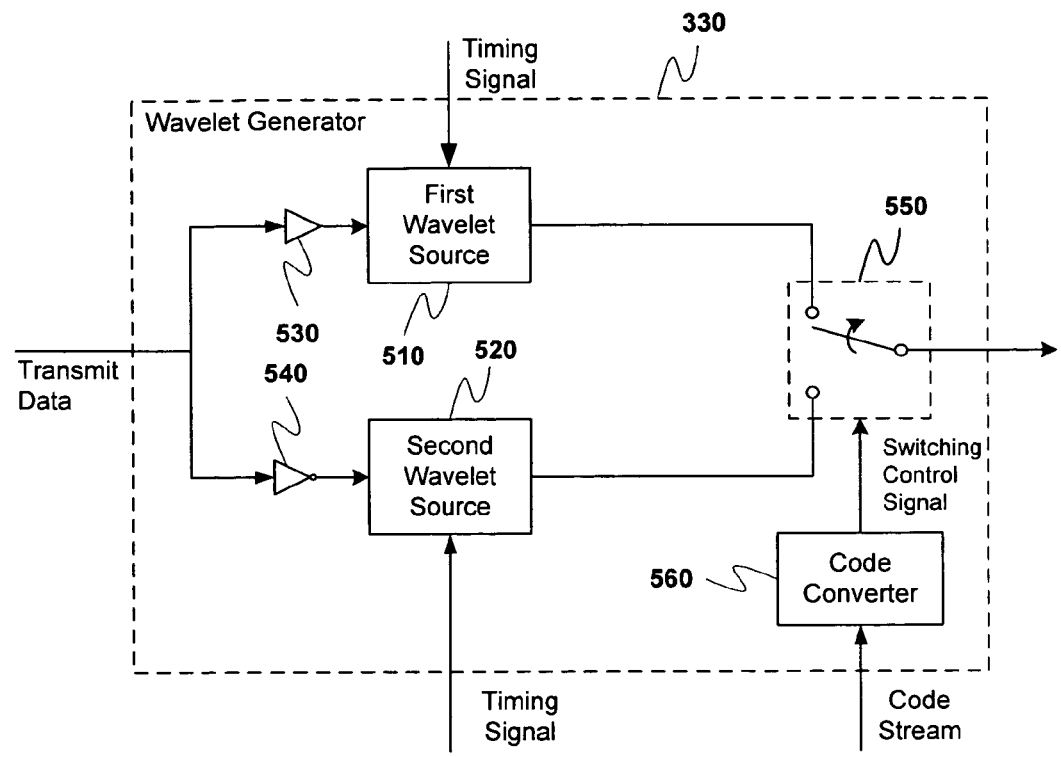
FIG. 5 is a block diagram of a first exemplary embodiment of the wavelet generator from FIG. 3.

FIG. 5 is a block diagram of a first exemplary embodiment of the wavelet generator from FIG. 3. As shown in FIG. 5, the wavelet generator 330 includes a first wavelet source 510, a second wavelet source 520, a non-inverting amplifier 530, an inverting amplifier 540, a switch 550, and a code converter 560. This particular embodiment is configured to use a binary code word, although other code word types could be used in alternate embodiments.

In the embodiment disclosed in FIG. 5, the first wavelet source 510 and the second wavelet source 520 each generate a series of wavelets alternating between a first and second orientation (e.g., an up pulse, followed by a down pulse, followed by an up pulse, etc.). Since there are two alternating wavelets generated, there are also two possible operation modes for each of the first and second wavelet sources 510 and 520, i.e., generating a first wavelet on even timing cycles and a second wavelet on odd timing cycles, or generating a second wavelet on even timing cycles and a first wavelet on odd timing cycles.

The non-inverting amplifier 530 receives the transmit data and provides a first control signal to the first wavelet source 510. The inverting amplifier 540 receives the transmit data, inverts it, and provides a second control signal to the second wavelet source 520. In this embodiment the inverting amplifier 530 and the non-inverting amplifier 540 are arranged so that they will provide the same delay to the transmit data signal.

The switch 550 operates in response to a switching control signal to select one of the first and second wavelet sources 510 and 520 for each cycle of the timing signal.

The code converter 560 operates to convert a code word into the switching control signal that instructs the switch 550 to select the proper wavelets to produce a desired modulated wavelet stream as a signal stream.

In operation the first and second wavelet sources 510 and 520 receive a non-inverted copy of the transmit data signal and an inverted copy of the transmit data signal, respectively. Because they each receive an inverse of the signal received by the other, the first wavelet source 510 and the second wavelet source 520 operate in two different operation modes. In other words, when the first wavelet source 510 is generating a wavelet having a first wavelet orientation (e.g., an up pulse), the second wavelet source 520 is generating a wavelet having a second wavelet orientation (e.g., a down pulse). And when the first wavelet source 510 is generating a wavelet having the second wavelet orientation, the second wavelet source 520 is generating a wavelet having the first wavelet orientation The switching control signal is created such that it causes the switch 550 to select the proper sequence of the wavelet sources 510 and 520 to create a wavelet stream having wavelets in orientations that correspond to proper data-modulated code words. In other words, if a length 6 binary code word were 1 −1 −1 −1 1 1, then the switching control signal should be such that it consecutively selects whichever of the first and second wavelet sources will provide this sequence of modulated wavelets (with a "1" in the code word indicating a first wavelet orientation and a "−1" in the code word indicating a second wavelet orientation). For example, the switching control signal for this code word might be 1 1 −1 1 1 −1 (i.e., select the first wavelet source 510 for the first chip, the first wavelet source 510 for the second chip, the second wavelet source 520 for the third chip, the first wavelet source 510 for the fourth chip, the first wavelet source 510 for the fifth chip, and the second wavelet source 520 for the sixth chip).

Because the operation of the first and second wavelet sources 510 and 520 is predictable, the code converter 560 can convert the code word into the switching control signal.

Although in this embodiment the first and second wavelet sources 510 and 520 alternate wavelet orientations at the chipping rate, alternate embodiments could implement this differently. In one alternate embodiment, the first wavelet source 510 could produce a constant stream of the first orientation of the wavelet, while the second wavelet source 520 produced a constant stream of the second orientation of the wavelet. In another embodiment the first and second wavelet sources 510 and 520 each alternate between producing the first orientation of the wavelet and the second orientation of the wavelet, but at a different frequency than every cycle of the chipping clock.

Regardless, as long as the output of the first and second wavelet sources 510 and 520 are different and predictable, a proper switching control signal can be generated by the code converter 560 that will select the proper sequence of the first and second wavelet sources 510 and 520 to generate the desired signal stream including wavelets modulated by the code words and the transmit data.

Although the embodiment of FIG. 5 is configured to employ a binary code word, it could be modified to employ a ternary code word by including a third input to the switch 550 that was connected to ground. In such an alternate embodiment the switching control signal would also be ternary. When the switching control signal had a +1 or −1 value it could select the input corresponding to the proper wavelet source 510 of 520, when the switching control signal had a 0 value, it could select the ground voltage.

Figure 6:
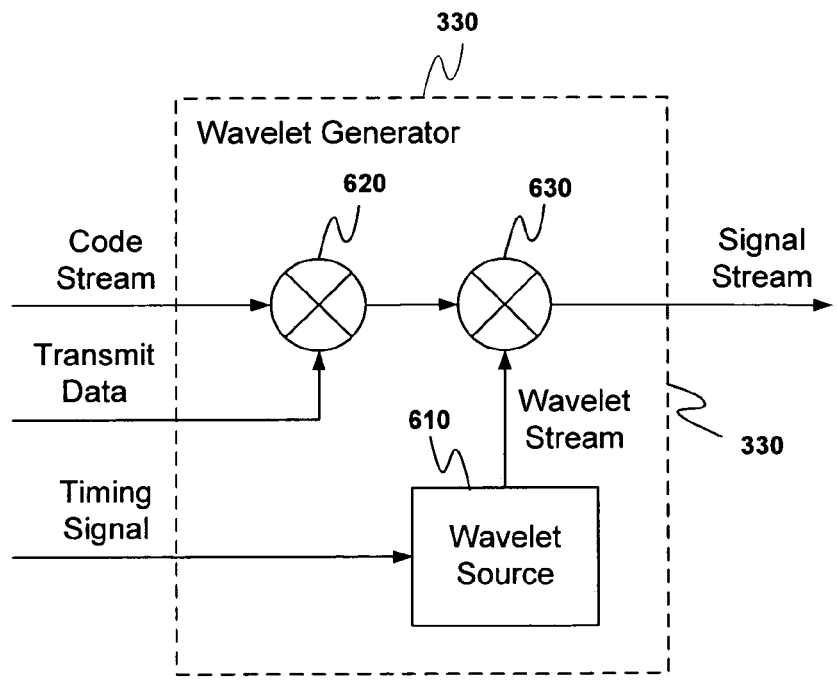
FIG. 6 is a block diagram of a second exemplary embodiment of the wavelet generator from FIG. 3.

FIG. 6 is a block diagram of a second exemplary embodiment of the code generator from FIG. 3. As shown in FIG. 6, the wavelet generator 330 includes a wavelet source 610, a first wavelet mixer 620, and a second wavelet mixer 630. This particular embodiment is configured to use either a binary or a ternary code word.

The wavelet source 610 generates a series of wavelets that are synchronized with the timing signal. In one embodiment each wavelet comprises one or more consecutive cycles of a sine wave having a frequency of N times the chipping rate, where N is the number of cycles per wavelet. In this embodiment the wavelet source 620 can be a ×N phase locked loop (PLL). Alternate embodiments could use other circuits for creating the desired sine waves for the wavelets, however. In addition, other kinds of wavelet sources could be used in other embodiments for different styles of wavelets (e.g., Gaussian monopulses, single-cycle sine waves, or other shaped impulse signals).

The first wavelet mixer 620 mixes the code stream output from the code generator 320 with the transmit data signal to create a stream of data-modulated code words. Because the chipping rate is L times the data rate (where L is the code word length), each data bit from the transmit data signal will modulate L pulses in the code stream, i.e., an entire code word.

The second wavelet mixer 630 mixes the data-modulated code word output from the first wavelet mixer 620 with the wavelet stream from wavelet source 610. Because the code stream and the wavelet stream are both synchronized with the timing signal, each wavelet is ultimately combined with a single pulse from the code stream. This has the effect of creating a signal stream comprised of a stream of wavelets that are modulated first by the code word being used, and then by the transmit data bits. In an exemplary embodiment with ternary coding, these modulated wavelets include non-inverted wavelets corresponding to +1 pulses from the code stream, null wavelets corresponding to 0 pulses from the code stream, and inverted wavelets corresponding to −1 pulses from the code stream.

Although the first wavelet mixer 620 is shown in FIG. 6 as being placed before the second wavelet mixer 630, these elements could swap places in alternate designs. In addition, some embodiments could combine the two elements into a single circuit.

Figure 7:
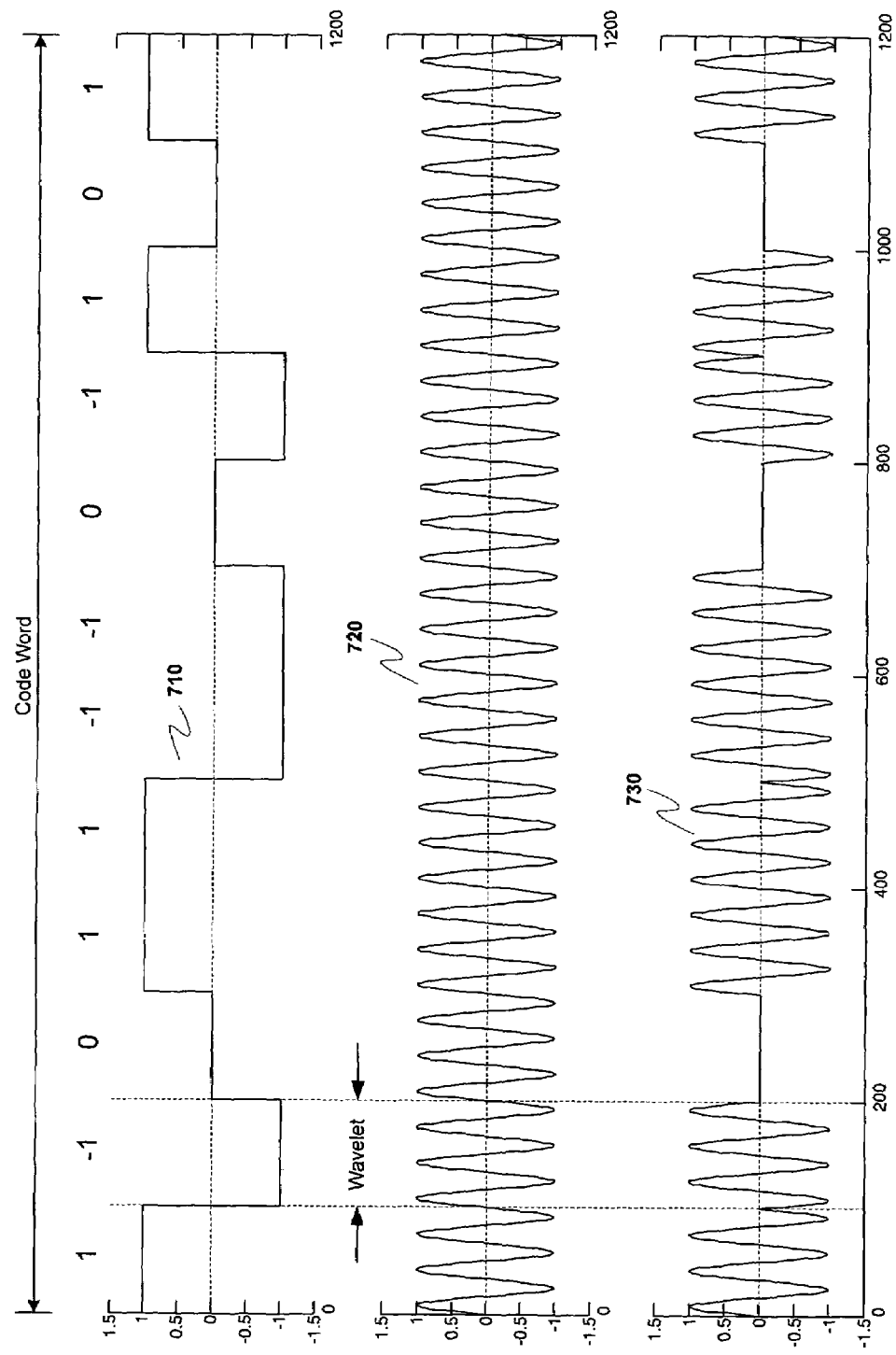
FIG. 7 is a graph of an exemplary code stream, wavelet stream, and signal stream according to a disclosed embodiment of the present invention.

FIG. 7 is a graph of an exemplary code stream, wavelet stream, and signal stream according to a disclosed embodiment of the present invention. In particular, FIG. 7 shows streams for a single length twelve code word using ternary encoding. This embodiment could be implemented using the wavelet generator of FIG. 6, using three cycles of a sine wave as a wavelet.

As shown in FIG. 7, the code stream 710 indicates the twelve consecutive values that make up a code word (e.g., 1 −1 0 1 1 −1 −1 0 −1 0 1 0 1 in the embodiment disclosed in FIG. 7).

The wavelet stream 720 shows twelve consecutive wavelets. In the disclosed embodiment each wavelet comprises three consecutive cycles of a sine wave. As a result, the wavelet stream is simply a sine wave at three times the frequency of the code stream (i.e., at three times the chipping rate). However, in alternate embodiments other wavelet types (e.g., Gaussian monopulses, single-cycle sine waves, or other shaped impulse signals) could be used.

The signal stream 730 is the result of the wavelet stream 720 being modulated by the code stream 710. As shown in FIG. 7, the signal stream includes, consecutively, a non-inverted pulse, an inverted pulse, a null pulse, a non-inverted pulse, a non-inverted pulse, an inverted pulse, an inverted pulse, a null pulse, an inverted pulse, a non-inverted pulse, a null pulse, and a non-inverted pulse, which corresponds to the values 1 −1 0 1 1 −1 −1 0 −1 0 1 0 1 of the code word formed by the code stream 710.

Although twelve pulses of a length twelve code word and corresponding wavelets are shown in FIG. 7, the code stream 710, wavelet stream 720, and signal stream 730 may be as long or short as necessary to transmit a desired amount of data, including multiple code words and employing code words of different lengths. And while a length twelve code word is disclosed, other code word lengths can be used as needed.

Figure 8:
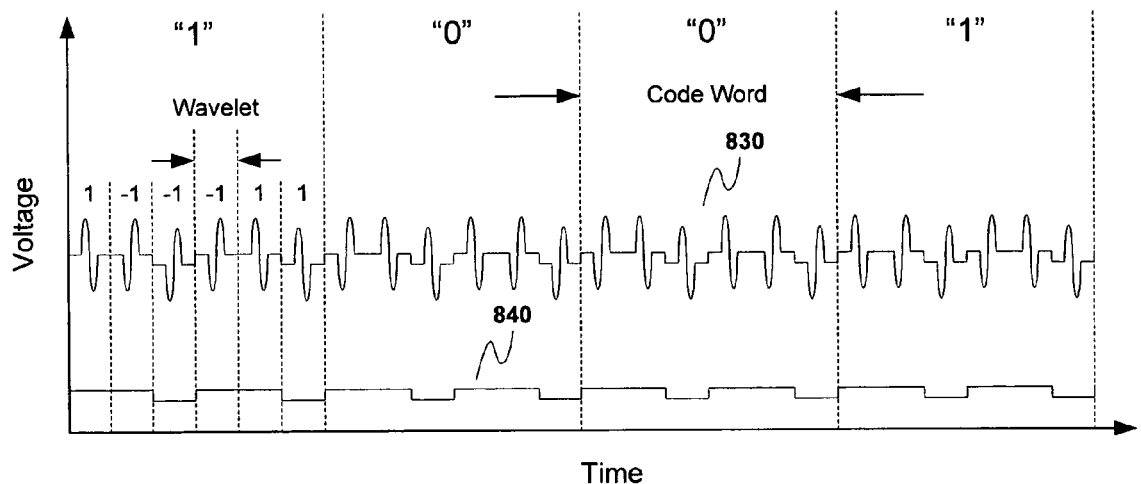
FIG. 8 is a graph of an exemplary signal stream according to a disclosed embodiment of the present invention.

FIG. 8 is a graph of an exemplary signal stream according to a disclosed embodiment of the present invention. In particular, FIG. 8 shows a signal stream for four length six code words using binary encoding. This embodiment is implemented using the wavelet generator 330 of FIG. 5, in which the first and second wavelet sources 510 and 520 are selected in a set pattern (as determined by the switching control signal) to generate the desired modulated wavelets.

As shown in FIG. 8, the six consecutive values that make up a code word are 1 −1 −1 −1 1 1. Each bit of data in the transmit data stream is imposed upon a single code word, leaving it unchanged for a logical "1," and inverting it for a logical "0." The data modulated code word is then used to generate a switching control signal that instructs the wavelet generator 330 to construct a signal stream 830 of data-modulated and code-word-modulated wavelets (as described above with respect to FIGS. 3 to 5). In the embodiment of FIG. 8, Gaussian monopulses are used as wavelets, although alternate embodiments could use different wavelengths.

The exemplary signal stream 830 of FIG. 8 contains four bits (1 0 0 1), each bit represented by six wavelets modulated either by a non-inverted code word (for one data value) or an inverted code word (for the other data value).

However, because no two circuits are ever identical, there will be at least minimal offsets between the outputs of the first and second code sources 510 and 520. These could be caused by offsets in the current or voltage values of the signals output by the first and second code sources 510 and 520. Regardless of the cause, because wavelets are selected by the switch 550 from the first and second wavelet sources 510 and 520 and are sent on in the signal stream, the small offsets will remain and will appear in the final spectrum of the signal transmitted by the antenna 120. This signal offset is shown in the signal stream 830 of FIG. 8 by the fact that every other wavelet is slightly offset from each other in voltage. However, for ease of understanding, a graph of the offset voltage 840 alone is also shown. This offset voltage 840 shows how the voltages of sequential wavelets are systemically different.

The pattern of the offset voltage 840 is set by the values of the switching control signal output from the code converter 560. Since the switching control signal sets when the first wavelet source 510 will be used, and when the second wavelet source 520 will be used, it will also set which offsets will appear where.

As can be seen by the graph of the offset voltage 840, the offset voltage 840 is a repetitive signal of consistent magnitude throughout the entirety of the signal stream. The result of this repetitive signal is spectral lines (i.e., spikes in the spectral power density over frequency) appearing in the resulting signal to be transmitted by the antenna 120.

Although this example shows a voltage offset, the same sort of periodic harmonics could be caused by slight magnitude differences, phase differences, or anything else that would produce a repeated interference with the signal to be transmitted.

Figure 9:
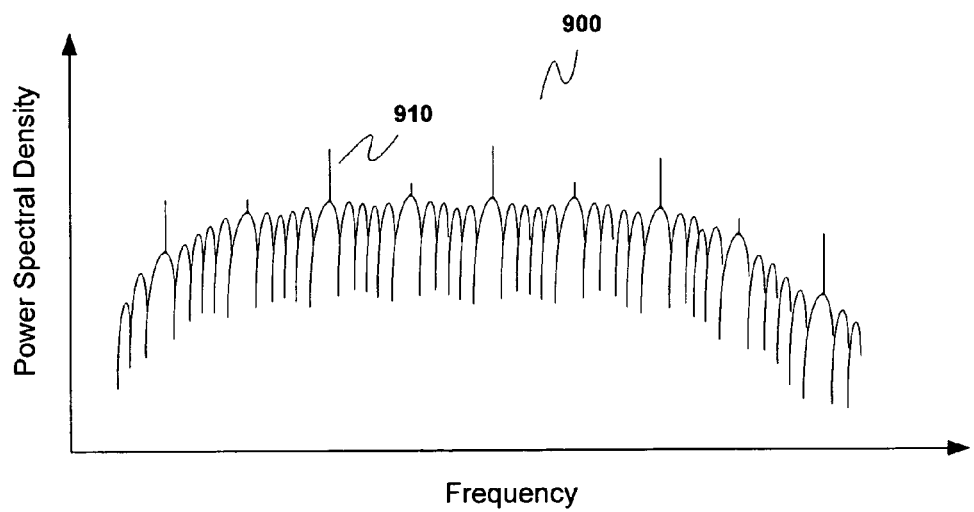
FIG. 9 is an exemplary graph of the power spectral density versus frequency for a signal stream with a constant periodic offset leakage.

FIG. 9 is an exemplary graph of the power spectral density versus frequency for a signal stream with a constant periodic offset leakage. As shown in FIG. 9, the power spectral density 900 includes spikes 910 (i.e., spectral lines) that are caused by the offset leakages.

These spectral spikes 910 can limit the total available power in a device that must meet the restrictions imposed by the FCC. Since no portion of the power spectral density can exceed the FCC limits, the highest of the spikes 910 must be kept within the maximum power spectral density allowed. As a result, the main portion of the power spectral density can remain comparatively much lower, significantly restricting the total power of the resulting transmission.

In addition, undesirable spectral lines can appear even in embodiments that do not use the wavelet generator of FIG. 5. This is because of the non-ideal nature of the mixers that must be used in any embodiment. As noted above, no circuit element, mixers includes is ideal. Any DC offset within an input signal to a mixer can cause an undesirable leakage through that element.

Consider a mixer with two input signals, $S_1$ and $S_2$. Ideally, the output would simply be the product $S_1*S_2$. However, each of the input signals may have a DC offset associated with it, such that the input signals are actually $S_1+V_{off-1}$ and $S_2+V_{off-2}$, where $V_{off-1}$ is a first DC offset voltage and $V_{off-2}$ is a second DC offset voltage. The product of these two signals is thus actually:

$$(S_1+V_{off-1})(S_2+V_{off-2})=S_1*S_2+S_1*V_{off-2}+S_2*V_{off-1}+V_{off-1}*V_{off-2}. \qquad (1)$$

The terms $S_1 * V_{off-2}$ and $S_2 * V_{off-1}$ can add regular offset values to the output of the mixer if either of the offset voltages $V_{off-1}$ and $V_{off-2}$ are non-zero. And as with the offset voltages 840 of FIG. 8, when an offset voltage is regular, it can cause undesirable spikes in the power spectral density of the resulting signal.

As noted above, the same sorts of periodic interference can also arise from slight difference in phase and magnitude of signals, or anything else that will create repeated signal elements.

Second Exemplary Embodiment

Figure 10:
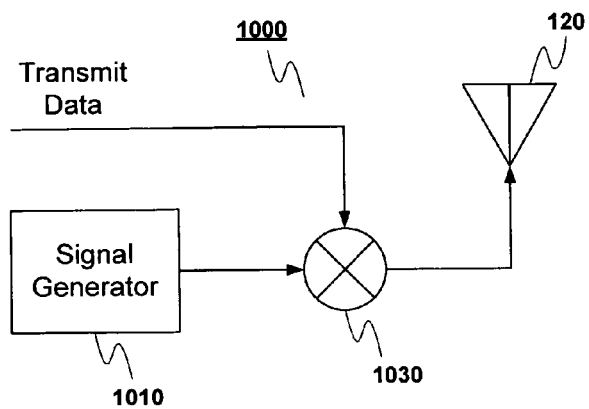
FIG. 10 is a block diagram of an exemplary wireless transmitter according to embodiments of the present invention.

An alternate embodiment limits the presence of spectral lines by effectively randomizing the output of the signal generator 110. FIG. 10 is a block diagram of a wireless transmitter according to embodiments of the present invention. As shown in FIG. 10, the transmitter 1000 includes a signal generator 1010, a signal mixer 1030, and an antenna 120.

The signal generator 1010 operates similar to the signal generator 110 in FIG. 1. However, unlike the circuit of FIG. 1, the signal generator 1010 in FIG. 10 produces a wavelet stream that is unmodulated by the transmit data stream. In other words, the signal generator 1010 simply produces a stream of wavelets that are modulated only by a repeated code word.

The signal mixer 1030 receives the unmodulated signal stream output from the signal generator 1010 and further modulates the code-word-modulated wavelets with the transmit data stream to produce a signal stream for transmission. Thus, when the output of the signal generator 1010 is referred to as "unmodulated," it refers to modulation by the transmit data stream, not modulation by the code word.

The antenna 120 serves to transmit the output of the signal mixer 1030 to a remote device. In the embodiment shown in FIG. 10, a UWB antenna may be used, such as the one disclosed in U.S. Pat. No. 6,590,545 to McCorkle, entitled "Electrically Small Planar UWB Antenna Apparatus and System Thereof." However, alternate embodiments can use different antenna designs.

Although not shown, the transmitter 1000 can include various other circuitry to prepare a signal for transmission. For example it can include various filters, amplifiers, and other back end circuitry.

Figure 11:
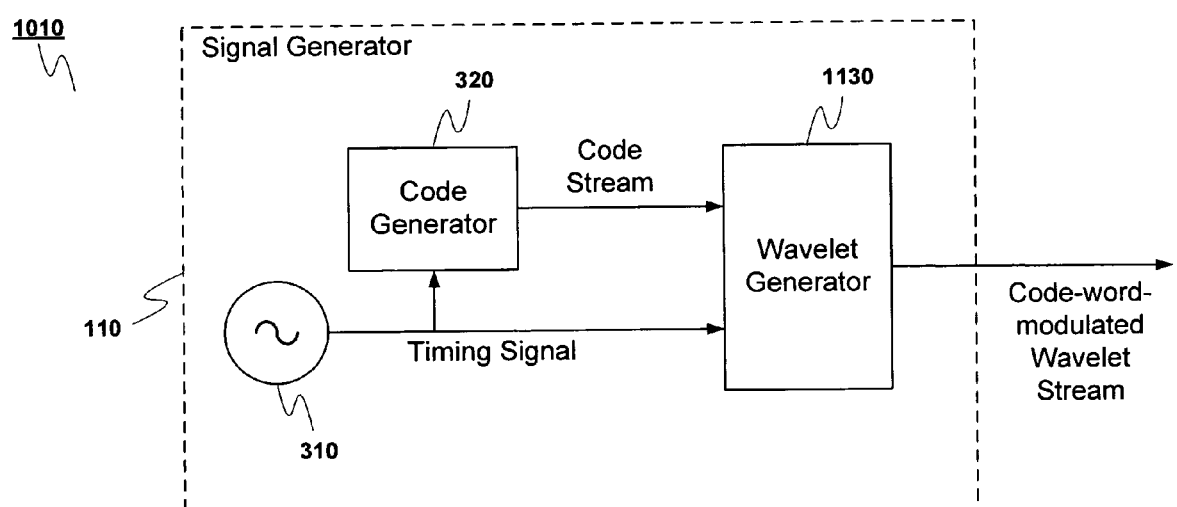
FIG. 11 is a block diagram of an exemplary embodiment of the signal generator from FIG. 10.

FIG. 11 is a block diagram of an exemplary embodiment of the signal generator from FIG. 10. Such a signal generator could be used in the UWB transceiver shown in FIG. 10. As shown in FIG. 11, the signal generator 1010 includes a local oscillator 310, a code generator 320, and a wavelet generator 1130.

The local oscillator 310 and the code generator 320 operate as disclosed above with respect to FIG. 3.

The wavelet generator 1130 receives the timing signal from the local oscillator 310 and the code word stream from the code generator 320. It operates to generate a series of wavelets that are formed into code word-modulated wavelets. The orientation and placement of the wavelets corresponds to the orientation and arrangement of the pulses from the code generator 320. The code-word-modulated wavelets output by the wavelet generator are then sent onwards as an unmodulated (by data) signal stream that will later be modulated by the transmit data. The wavelets formed by the wavelet generator 330 should each be the same width as the pulses output from the code generator 320 (i.e., the wavelets should be generated at the chipping rate), and should be synchronized with the code pulses (i.e., each wavelet should be coincident with one code pulse).

In operation the code generator 320 outputs a code stream including a series of L encoded pulses for each code word. The pulses that make up the code word are given values that correspond the values in the length L code word.

The code stream is provided to the wavelet generator 1130, which in turn generates a wavelet stream that is modulated by the code word, but is not modulated by the transmit data. This set of wavelets is formed from the same code word in the same orientation repeated again and again.

The code-word-modulated wavelet stream is mixed with the transmit data stream at the signal mixer 1030 to generate a data-modulated signal stream that is modulated by both the code word and the transmit data stream. Because the data rate is $$\frac{1^{th}}{L}$$

of the chipping rate, each bit of data in the transmit data stream remains active for a number of wavelets equal to the length of the code word used (i.e., if the code word length is twelve, then each data bit will remain active for twelve wavelets).

Furthermore, the transmit data bit stream is aligned with the signal stream such that each data bit corresponds to a single code word. In this way the stream of code-word-modulated wavelets (modulated according to the base code word) output from the signal generator 1010 will be further modulated by the data stream.

The code pulses generated by the code generator 320 and the wavelets generated by the wavelet generator 1130 are kept in synchronization by the timing signal generated by the local oscillator 310.

In one embodiment the data rate is 114 MHz, the local oscillator operates at 1.368 GHz, and the chipping rate is 1.368 GHz. In another embodiment, the data rate is 228 MHz, the local oscillator operates at 2.736 GHz, and the chipping rate is 2.736 GHz. Alternate embodiments can use different timing signals, data rates, and chipping rates. For example, one alternate embodiment uses a 1.3 GHz timing signal and varying chipping rates of 1.313, 1.326, 1.352 GHz.

In one embodiment each wavelet is formed by a Gaussian monopulse; in another embodiment each wavelet is formed by N consecutive repetitions of a sine wave (where N is a positive integer). In either case, the wavelet is formed such that it can have two different orientations, each the inverse of the other, to allow for binary or ternary modulation. Alternate embodiments can use alternate wavelet designs, however. And while certain advantage is obtained by having the bi-phase wavelet orientations that represent be inverses of each other, some embodiments could use bi-phase wavelet orientations that are not their inverses.

In the embodiment of FIG. 10, because the transmit data stream is effectively random, it serves to whiten the resulting modulated data stream and eliminate undesirable harmonics, which will thus reduce the presence of spectral spikes in the resulting transmission. As a result, although signal offsets will still remain in the modulated signal stream, they are whitened by the transmit data stream, which reduces the spectral lines they would otherwise produce. Because of this, the offsets do not cause the same spikes to the frequency spectrum as occur in the transmitter of FIG. 1. This in turn allows the transmitter to use a higher transmit power yet still remain within the spectral restrictions imposed by the FCC.

Furthermore, although offsets are disclosed, this method of reducing spectral lines is effective for any repeated signal elements or harmonics.

Figure 12:
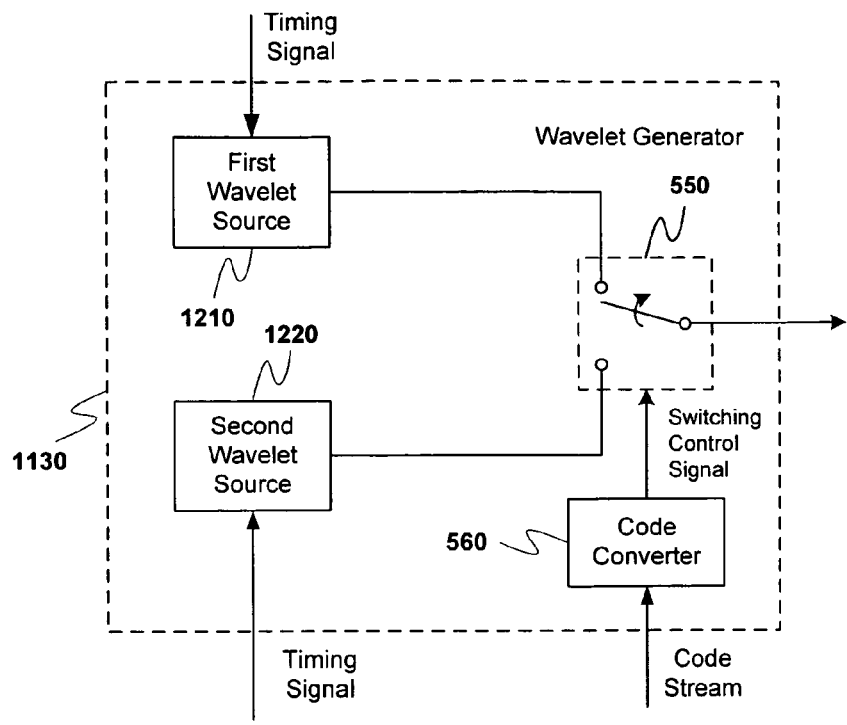
FIG. 12 is a block diagram of a first exemplary embodiment of the wavelet generator from FIG. 11.

FIG. 12 is a block diagram of a first exemplary embodiment of the wavelet generator from FIG. 11. As shown in FIG. 12, the wavelet generator 1130 includes a first wavelet source 1210, a second wavelet source 1220, a switch 550, and a code converter 560. This particular embodiment is configured to use a binary code word, although alternate embodiments could use other code word types.

In the embodiment disclosed in FIG. 12, the first wavelet source 1210 and the second wavelet source 1220 each generate a series of wavelets alternating between a first and second orientation (e.g., an up pulse, followed by a down pulse, followed by an up pulse, etc.). Since there are two alternating wavelets generated, there are also two possible operation modes for each of the first and second wavelet sources 1210 and 1220, i.e., generating a first wavelet on even timing cycles and a second wavelet on odd timing cycles, or generating a second wavelet on even timing cycles and a first wavelet on odd timing cycles. Regardless, the operation mode is not changed dynamically based on the transmit data. The operation mode is either fixed or changes in ways unrelated to the transmit data.

The switch 550 and the code converter 560 operate as described above with reference to FIG. 5.

In operation, the first wavelet source 1210 and the second wavelet source 1220 proceed in two different operation modes. In other words, when the first wavelet source 1210 is generating a wavelet having a first wavelet orientation (e.g., an up pulse), the second wavelet source 1220 is generating a wavelet having a second wavelet orientation (e.g., a down pulse). And when the first wavelet source 1210 is generating a wavelet having the second wavelet orientation, the second wavelet source 1220 is generating a wavelet having the first wavelet orientation Although in this embodiment the first and second wavelet sources 1210 and 1220 alternate wavelet orientations at the chipping rate, alternate embodiments could implement this differently. In one alternate embodiment, the first wavelet source 1210 could produce a constant stream of the first orientation of the wavelet, while the second wavelet source 1220 produced a constant stream of the second orientation of the wavelet. In another embodiment the first and second wavelet sources 1210 and 1220 each alternate between producing the first orientation of the wavelet and the second orientation of the wavelet, but at a different frequency than every cycle of the chipping clock.

Regardless, as long as the output of the first and second wavelet sources 1210 and 1220 are different and predictable, a proper switching control signal can be generated by the code converter 560 that will select the proper sequence of the first and second wavelet sources 1210 and 1220 to generate the desired signal stream including wavelets modulated by the code word.

Although the embodiment of FIG. 12 is configured to employ a binary code word, it could be modified to employ a ternary code word by including a third input to the switch 550 that was connected to ground. In such an alternate embodiment the switching control signal would also be ternary. When the switching control signal had a +1 or −1 value it could select the input of the switch 550 corresponding to the proper wavelet source 1210 of 1220, when the switching control signal had a 0 value, it could select the input of the switch connected to the ground voltage.

Figure 13:
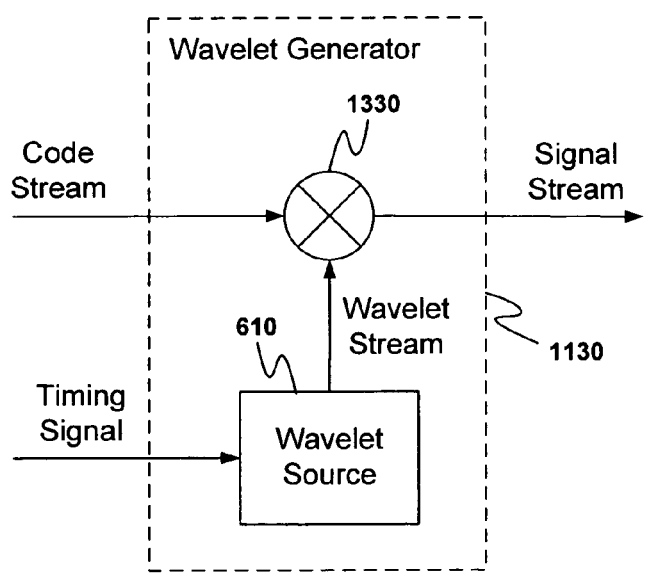
FIG. 13 is a block diagram of a second exemplary embodiment of the wavelet generator from FIG. 10.

FIG. 13 is a block diagram of a second exemplary embodiment of the wavelet generator from FIG. 11. As shown in FIG. 13, the wavelet generator 1330 includes a wavelet source 610 and wavelet mixer 1330. This particular embodiment is configured to use either a binary or a ternary code word.

The wavelet source 610 operates as described above with respect to FIG. 6.

The wavelet mixer 1330 mixes the code stream output from the code generator 320 with the wavelet stream from wavelet source 610. Because the code stream and the wavelet stream are both synchronized with the timing signal, each wavelet is combined with a single pulse from the code stream. This has the effect of creating a signal stream comprised of a stream of wavelets that are modulated by the code word being used. In an exemplary embodiment with ternary coding, these modulated wavelets include non-inverted wavelets corresponding to +1 pulses from the code stream, null wavelets corresponding to 0 pulses from the code stream, and inverted wavelets corresponding to −1 pulses from the code stream.

Figure 14:
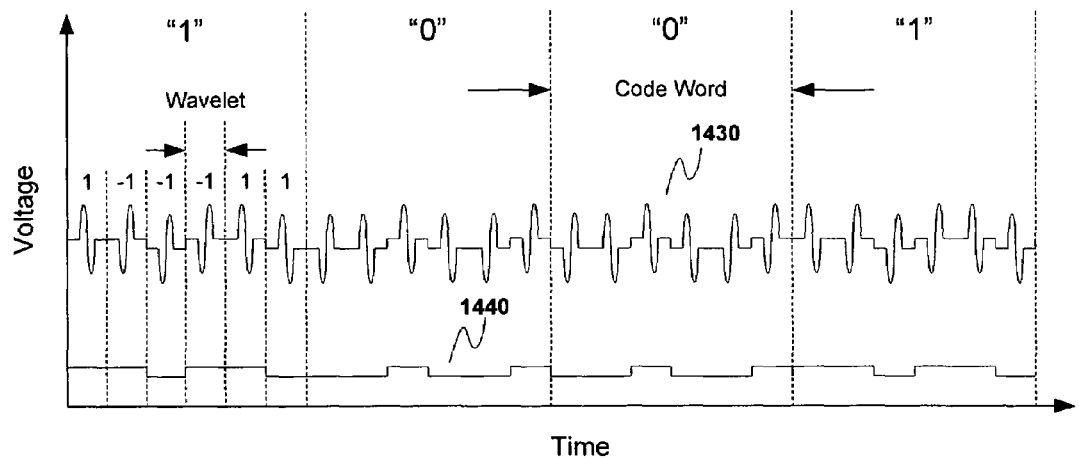
FIG. 14 is a graph of an exemplary signal stream according to a disclosed embodiment of the present invention.

FIG. 14 is a graph of an exemplary signal stream according to a disclosed embodiment of the present invention. In particular, FIG. 14 shows a signal stream for four length six code words using binary encoding. This embodiment is implemented using the wavelet generator of FIG. 12, in which the first and second wavelet sources 1210 and 1220 are selected in turn to generate the desired wavelets.

As shown in FIG. 14, the six consecutive values that make up a code word are 1 −1 −1 −1 1 1. Each bit of data in the transmit data stream is imposed upon a single code word, leaving it unchanged for a logical "1," and inverting it for a logical "0." The data-modulated code word is then used to generate a signal stream 1430 of data-modulated and code-word-modulated wavelets. In the embodiment of FIG. 14, Gaussian monopulses are used as wavelets, though alternate embodiments could use different wavelet types.

The signal stream 1430 of FIG. 14 contains four bits (1 0 0 1), each bit represented by six wavelets modulated either by a non-inverted code word (for one data value) or an inverted code word (for the other data value).

As noted above, because no two circuits are ever identical, there will be at least minimal offsets between the outputs of the first and second code sources 1210 and 1220. However, since the transmit data (which is effectively random) is modulated into the data stream after the wavelets are formed, rather than before, the values of the offsets will be randomly oriented from code word to code word. For ease of understanding, a graph of the offset voltage 1440 alone is also shown. This offset voltage 1440 shows how the distribution of the offset voltages does not have a discernable pattern.

The pattern of the offset voltage 1440 is set by the values of the switching control signal output from the code converter 560. Since the switching control signal sets when the first wavelet source 1210 will be used, and when the second wavelet source 1220 will be used, it will also set which offsets will appear where.

However, as can be seen by the graph of the offset voltage 1440, the magnitudes of the offset voltage 1440 also vary according to the transmit data. When the transmit data has one value (e.g., logical "1"), the offset voltage pattern for a given code word has a first orientation. And when the transmit data has the other value (e.g. logical "0"), the offset voltage pattern for a given code word has a second orientation.

Because the values of the transmit data are effectively random, the offset patterns are also effectively random. And as a result of this random distribution of offsets, the offsets will not have a repeated pattern, and so will not cause any significant spectral lines (i.e., spikes in the spectral power density over frequency) in the resulting signal to be transmitted by the antenna 120.

Although this example shows a voltage offset, the same sort of periodic harmonics could be caused by slight magnitude differences, phase differences, or anything else that would produce a repeated interference with the signal to be transmitted. However, any harmonics that appear before the transmit data is mixed into the signal will be reduced by the whitening effect of mixing in the transmit data.

Figure 15:
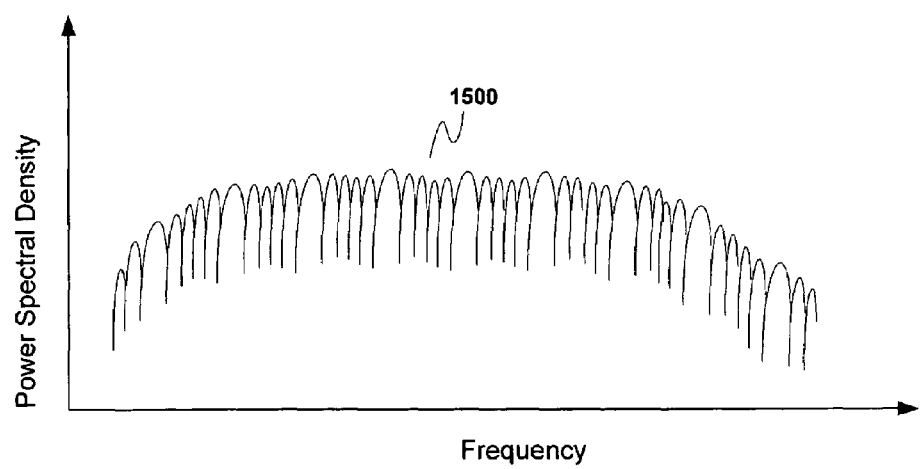
FIG. 15 is an exemplary graph of the power spectral density versus frequency for a signal stream with an effectively random periodic offset leakage.

FIG. 15 is an exemplary graph of the power spectral density versus frequency for a signal stream with an effectively random periodic offset leakage. As shown in FIG. 15, the power spectral density 1500 does not include any spikes (i.e., spectral lines) caused by the offset leakages.

Since there are no spectral spikes, the total power of the transmitted signal can be increased until the power spectral density 1500 reaches the maximum power spectral density allowed. As a result, the total power of the resulting transmission is larger than a comparable circuit according to FIG. 1.

Figure 16:
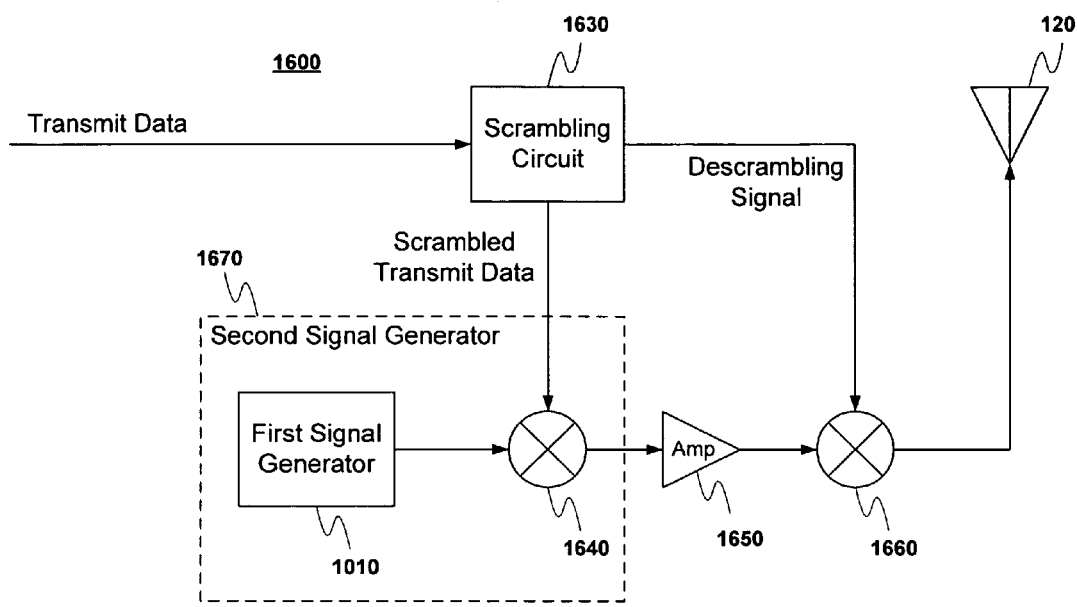
FIG. 16 is a block diagram of an exemplary wireless transmitter that employs a scrambling circuit according to embodiments of the present invention.

FIG. 16 is an alternate transmitter design that employs a scrambling circuit according to embodiments of the present invention. As shown in FIG. 16, the transmitter 1600 includes a first signal generator 1010, an antenna 120, a scrambling circuit 1630, a first mixer 1640, an amplifier 1650, and a second mixer 1660.

The first signal generator 1010 operates as the signal generator 1010 described above with respect to FIGS. 10 and 11.

The antenna 120 operates as the antenna of FIG. 1. In particular, it can be a UWB antenna such as the one disclosed in U.S. Pat. No. 6,590,545 to McCorkle, entitled "Electrically Small Planar UWB Antenna Apparatus and System Thereof." However, alternate embodiments can use different antenna designs.

The scrambling circuit 1630 receives the transmit data stream and generates two signals: a scrambled transmit data signal and a descrambling signal. The scrambled data signal is a whitened version of the transmit data signal, and the descrambling signal is a signal that can be mixed with the scrambled transmit data signal to extract the transmit data.

The first mixer 1640 operates as the mixer 1030 of FIG. 10. As above, the first mixer 1640 receives from the first signal generator 1010 a wavelet stream that is modulated by the code words but is unmodulated by the transmit data. As a result, when this code-word-modulated wavelet stream is mixed with the scrambled transmit data signal, the result is either a non-inverted or inverted version of the code-word-modulated wavelet stream, depending upon the value of the scrambled transmit data signal. And because the scrambled transmit data signal is provided at the data rate (which is $$\frac{1^{th}}{L}$$

of the chipping rate), each bit of scrambled transmit data signal will modulate all of the wavelets that form a code word.

In alternate embodiments the first mixer 1640 may be placed within the first signal generator 1010. The first mixer 1640 may be placed between the code generator 320 and a wavelet mixer 630 (if a wavelet mixer 630 is used), or it may be formed as a single block with the wavelet mixer 630.

The amplifier 1650 performs back end amplification on the signal stream to prepare it for transmission. In the disclosed embodiment the amplifier 1650 is a differential amplifier. Nevertheless, because of potential clock leakage within the first mixer 1640 as well as a wavelet mixer 620 in the wavelet generator 330 (if a wavelet mixer 620 is used), there can be certain signal portions created that will cause spectral lines in a transmitted signal.

The second mixer 1660 receives the output from the amplifier 1650 and mixes it with the descrambling signal from the scrambling circuit 1630. Since the descrambling signal is set to give the transmit data signal when mixed with the scrambled transmit data, the output of the second mixer 1660 will effectively be the transmit data signal mixed with the output of the signal generator (i.e., an inverted or non-inverted version of the transmit data).

Although the transmitter of FIG. 10 eliminates the spectral effect of the undesired offsets by mixing it with the effectively random transmit data, the embodiment of FIG. 16 adds a further layer of randomness to the signal stream to further reduce the effect of undesirable harmonics on the spectrum of the transmitted signal.

This introduction of whitening can also allow for a greater number of device implementations. For example, the combination of the first signal generator 1010 and the first mixer 1640 can be considered to operate functionally as a second signal generator 1670. This second signal generator 1670 operates just as the signal generator 110 of FIG. 3, except that instead of receiving the transmit data signal, it receives the scrambled transmit data signal.

The second signal generator 1670 can use the circuits described above with respect to FIGS. 3 to 6 to generate a wavelet stream that is modulated by both a code word and the scrambled data signal. And while this scrambled-data-modulated wavelet stream will have all of the periodic signal elements described by example in FIG. 8, the effectively random descrambling signal will whiten the signal, significantly reducing any spectral lines in the resultant transmitted signal.

In operation, the first signal generator 1010 produces a stream of wavelets modulated by the code words in a code stream. As with the signal generator of the embodiment of FIG. 10, this stream of wavelets is modulated by the same repeated code word but is not modulated in any way by the transmit data.

The transmit data is provided to the scrambling circuit 1630, which produces the scrambled transmit data signal and the descrambling signal. The scrambled transmit data signal is a created by whitening the transmit data with a random or pseudo-random sequence. The scrambled transmit data is then mixed with the signal stream output by the first signal generator 1010 to produce a random sequence.

This random sequence is passed through the amplifier 1650 and then to the second mixer 1660, where it is mixed with the descrambling signal to extract the transmit data signal. Because the scrambled transmit data is an effectively random sequence, the descrambling signal is also random, or at least pseudo-random.

Figure 17:
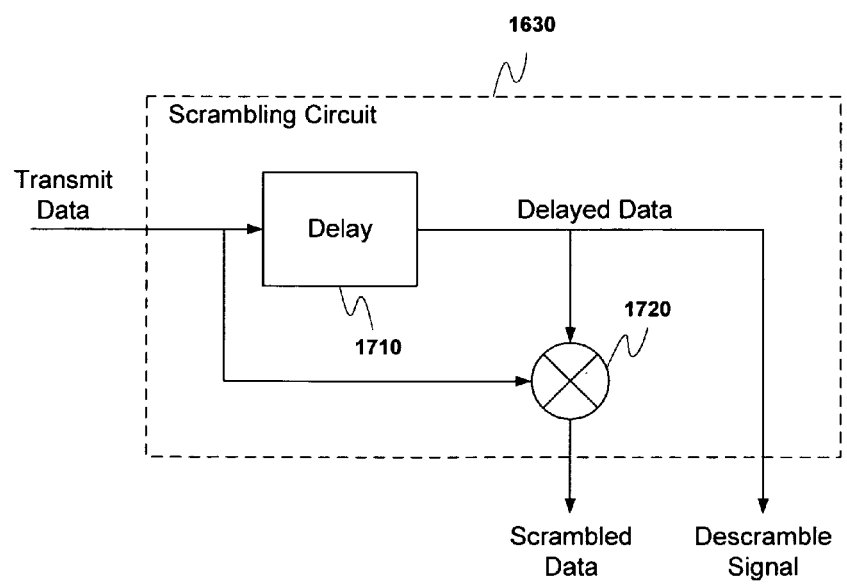
FIG. 17 is a block diagram of an exemplary embodiment of the scrambling circuit of FIG. 16.

FIG. 17 is a block diagram of the scrambling circuit of FIG. 16 according to an embodiment of the present invention. As shown in FIG. 17, the scrambling circuit 1630 includes a delay 1710 and a scrambler mixer 1720.

The delay 1710 can be a simple flip-flop delay (e.g., a D flip-flop) or could be a more complicated delay circuit. It operates to delay the transmit data signal by one data bit to generate a delayed transmit data signal.

The scrambler mixer 1720 serves to mix the transmit data signal with the delayed scramble data signal to produce the scrambled transmit data signal. Since the data is effectively random, mixing an $n^{th}$ bit with an $(n-1)^{th}$ bit will essentially whiten the resultant scrambled transmit data signal.

And the delayed transmit data signal can also be used as the descrambling signal. This will effectively have the delayed signal mixed with itself, which will restore the scrambled transmit data signal to its original form (i.e., will restore it to the transmit data). This is true because each bit of data in the delayed transmit data signal will either be represented by a positive voltage or a negative voltage of the same magnitude. As a result, when a current bit of transmit data is multiplied by two copies of the same delayed data bit (as effectively happens at the second mixer 1660), the result is that the values of the original signal are effectively multiplied by 1 (i.e., they remain unchanged). If a bit of delayed data is represented by a positive voltage, the product of the two positive voltages is the positive square of the magnitude. And if the bit of delayed data is represented by a negative voltage, then the product of the two negative voltages is also the positive square of the magnitude.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of mitigating spectral lines in a wireless signal, comprising:
   generating a code word comprising a plurality of pulses;
   generating a plurality of code-word-modulated wavelets in response to the code word;
   modulating the plurality of code-word-modulated wavelets with a bit of transmit data to form a plurality of data-modulated wavelets; and
   transmitting the plurality of data-modulated wavelets,
   wherein the step of generating the plurality of code-word-modulated wavelets comprises:
      generating a plurality of unmodulated wavelets; and
      mixing each of the plurality of unmodulated wavelets with one of the plurality of pulses.

2. The method of mitigating spectral lines in the wireless signal, as recited in claim 1, wherein the steps of generating the code word, generating the plurality of code-word-modulated wavelets, modulating the plurality of code-word-modulated wavelets, and transmitting the plurality of data-modulated wavelets are repeated for a plurality of consecutive data values in a set of transmit data.

3. The method of mitigating spectral lines in the wireless signal, as recited in claim 1, wherein the plurality of pulses are encoded using one of: a binary modulation scheme and a ternary modulation scheme.

4. The method of mitigating spectral lines in the wireless signal, as recited in claim 1, wherein each of the plurality of the data-modulated wavelets is one of: a plurality of consecutive cycles of a sine wave, a Gaussian monopulse a single-cycle sine wave, and a shaped impulse signal.

5. The method of mitigating spectral lines in the wireless signal, as recited in claim 1, wherein the method is embodied in an integrated circuit.

6. The method of mitigating spectral lines in the wireless signal, as recited in claim 1, wherein the method is embodied in an ultrawide bandwidth transceiver.

7. A method of mitigating spectral lines in the wireless signal, comprising:
   generating a code word comprising a plurality of pulses;
   generating a plurality of code-word-modulated wavelets in response to the code word;
   modulating the plurality of code-word-modulated wavelets with a bit of transmit data to form a plurality of data-modulated wavelets; and
   transmitting the plurality of data-modulated wavelets,
   wherein the step of generating the plurality of code-word-modulated wavelets comprises selectively choosing the output of one of a first wavelet source and a second wavelet source for each of the plurality of pulses.

8. The method of mitigating spectral lines in the wireless signal, as recited in claim 7 wherein the step of generating the plurality of code-word-modulated wavelets comprises:
   generating a plurality of unmodulated wavelets; and
   mixing each of the plurality of unmodulated wavelets with one of the plurality of pulses.

9. A method of mitigating spectral lines in a wireless signal, comprising:
   generating a code word comprising a plurality of pulses;
   generating a plurality of code-word-modulated wavelets in response to the code word;
   mixing the plurality of code-word-modulated wavelets with a scrambled transmit data signal to form a plurality of scrambled wavelets;
   amplifying the plurality of scrambled wavelets to form a plurality of amplified wavelets;
   mixing the plurality of amplified wavelets with a descrambling signal to form a plurality of data-modulated wavelets; and
   transmitting the plurality of data-modulated wavelets.

10. The method of mitigating spectral lines in the wireless signal, as recited in claim 9, wherein the step of generating the plurality of code-word-modulated wavelets comprises selectively choosing the output of one of a first wavelet source and a second wavelet source for each of the plurality of pulses.

11. The method of mitigating spectral lines in the wireless signal, as recited in claim 9, wherein the step of generating the plurality of code-word-modulated wavelets comprises:
   generating a plurality of unmodulated wavelets; and
   mixing each of the plurality of unmodulated wavelets with one of the plurality of pulses.

12. The method of mitigating spectral lines in the wireless signal, as recited in claim 9, wherein the steps of generating the code word, generating the plurality of code-word-modulated wavelets, mixing the plurality of code-word-modulated wavelets with the scrambled transmit data signal, amplifying the plurality of scrambled wavelets, mixing the plurality of amplified wavelets with the descrambling signal, and transmitting the plurality of data-modulated wavelets are repeated for a plurality of consecutive data values in a set of transmit data.

13. The method of mitigating spectral lines in the wireless signal, as recited in claim 9, wherein the plurality of pulses are encoded using one of: a binary modulation scheme and a ternary modulation scheme.

14. The method of mitigating spectral lines in the wireless signal, as recited in claim 9, further comprising:
   mixing an original transmit data signal with a delayed version of the original transmit data signal to form the scrambled transmit data signal,
   wherein the descrambling signal is the delayed version of the original transmit data signal.

15. The method of mitigating spectral lines in the wireless signal, as recited in claim 9, wherein the method is implemented in an integrated circuit.

16. The method of mitigating spectral lines in the wireless signal, as recited in claim 9, wherein the method is implemented in an ultrawide bandwidth transceiver.

17. A circuit for mitigating spectral lines in a wireless signal, comprising:
   a data scrambler for receiving a data bit stream, performing a scrambling function on data bits in the data bit stream, and providing a scrambled bit stream and a descrambling signal;
   a first mixer for mixing a plurality of first carrier pulses with the scrambled bit stream to produce a scrambled data stream;
   an amplifier for amplifying the scrambled data stream to provide an amplified data stream; and
   a second mixer for mixing the amplified data stream with the descrambling signal to produce a descrambled data stream.

18. The circuit for mitigating spectral lines in the wireless signal, as recited in claim 17, further comprising a signal generator for generating the plurality of first carrier pulses.

19. The circuit for mitigating spectral lines in the wireless signal, as recited in claim 18, wherein the signal generator comprises:
   a first wavelet source for generating a plurality of second carrier pulses;
   a second wavelet source for generating a plurality of third carrier pulses; and
   a switch for generating the plurality of first carrier pulses by repeatedly selecting one of the plurality of third carrier pulses or one of the plurality of second carrier pulses.

20. The circuit for mitigating spectral lines in the wireless signal, as recited in claim 17, wherein the data scrambler comprises:
   a delay circuit for receiving the data bit stream and outputting a delayed data bit stream as the descrambling signal; and
   a third mixer for mixing the data bit stream with the delayed data bit stream to produce the scrambled bit stream.

21. The circuit for mitigating spectral lines in the wireless signal, as recited in claim 17, further comprising an antenna for transmitting the descrambled data stream.

22. The circuit for mitigating spectral lines in the wireless signal, as recited in claim 17, wherein the circuit is embodied in an integrated circuit.

23. The circuit for mitigating spectral lines in the wireless signal, as recited in claim 17, wherein the circuit is embodied in an ultrawide bandwidth transceiver.

* * * * *